United States Patent
Mischler et al.

(10) Patent No.: US 11,346,238 B2
(45) Date of Patent: *May 31, 2022

(54) METHOD AND SYSTEMS FOR AN ENERGY RECOVERY AND ENERGY CONVERTING UNIT FOR AN ENGINE

(71) Applicant: Transportation IP Holdings, LLC, Norwalk, CT (US)

(72) Inventors: James Robert Mischler, Erie, PA (US); Roy James Primus, Niskayuna, NY (US); Thomas Michael Lavertu, Clifton Park, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/131,419

(22) Filed: Dec. 22, 2020

(65) Prior Publication Data

US 2021/0108534 A1    Apr. 15, 2021

Related U.S. Application Data

(60) Division of application No. 16/432,833, filed on Jun. 5, 2019, now Pat. No. 10,900,373, which is a continuation of application No. 15/199,260, filed on Jun. 30, 2016, now Pat. No. 10,337,347.

(51) Int. Cl.
| | |
|---|---|
| *F01D 15/10* | (2006.01) |
| *F02B 37/16* | (2006.01) |
| *F02D 29/06* | (2006.01) |
| *F02B 37/013* | (2006.01) |
| *F02M 26/02* | (2016.01) |

(52) U.S. Cl.
CPC ............ *F01D 15/10* (2013.01); *F02B 37/013* (2013.01); *F02B 37/164* (2013.01); *F02D 29/06* (2013.01); *F02M 26/02* (2016.02); *F05D 2220/40* (2013.01); *F05D 2220/62* (2013.01); *F05D 2220/76* (2013.01); *Y02T 10/12* (2013.01)

(58) Field of Classification Search
CPC ....... F01D 15/10; F02M 26/02; F02B 37/013; F02B 37/164; F02D 29/06; F05D 2220/40; F05D 2220/62; F05D 2220/76; Y02T 10/12

See application file for complete search history.

(56) References Cited

U.S. PATENT DOCUMENTS

| | | |
|---|---|---|
| 3,713,294 A | 1/1973 | Balje et al. |
| 7,478,533 B2 | 1/2009 | Ueno |
| 8,490,917 B2 | 7/2013 | Brooks et al. |

(Continued)

*Primary Examiner* — Viet P Nguyen
(74) *Attorney, Agent, or Firm* — McCoy Russell LLP

(57) ABSTRACT

Various methods and systems are provided for generating exhaust energy and converting exhaust energy to electrical energy while an engine is not running. In one example, a system for an engine comprises: a first turbocharger including a first compressor driven by a first turbine, the first turbine disposed in an exhaust of the engine; a fuel burner fluidly coupled to the exhaust upstream of the first turbine; a generator coupled to one of the first turbine or an auxiliary, second turbine fluidly coupled to the exhaust downstream of the fuel burner; and one or more bypass valves configured to adjust a flow of air that bypasses the engine and is delivered to the fuel burner.

6 Claims, 5 Drawing Sheets

(56) References Cited

U.S. PATENT DOCUMENTS

| | | |
|---|---|---|
| 8,646,564 B2 | 2/2014 | Khadiya et al. |
| 10,337,347 B2 * | 7/2019 | Mischler ............... F02B 37/013 |
| 10,900,373 B2 * | 1/2021 | Mischler ............... F02B 37/164 |
| 2004/0020194 A1 | 2/2004 | Nishimura et al. |
| 2006/0063046 A1 | 3/2006 | Hu et al. |
| 2008/0282699 A1 | 11/2008 | Barthelet et al. |
| 2009/0038308 A1 | 2/2009 | Nagae |
| 2009/0183499 A1 | 7/2009 | Boorse |
| 2010/0089056 A1 | 4/2010 | Cooper et al. |
| 2010/0100300 A1 * | 4/2010 | Brooks .................... F01N 3/20 701/102 |
| 2012/0323465 A1 | 12/2012 | Peters et al. |
| 2013/0073176 A1 | 5/2013 | Thompson et al. |
| 2013/0174546 A1 | 7/2013 | Yacoub |
| 2014/0067236 A1 | 3/2014 | Henry et al. |
| 2015/0097376 A1 | 4/2015 | Thalhauser et al. |
| 2015/0240705 A1 | 8/2015 | Wu et al. |
| 2015/0330282 A1 | 11/2015 | Cusworth et al. |
| 2017/0002726 A1 | 1/2017 | Iwamoto |
| 2017/0145933 A1 | 5/2017 | Dudar |
| 2017/0335805 A1 | 11/2017 | Zhang |

* cited by examiner

METHOD AND SYSTEMS FOR AN ENERGY RECOVERY AND ENERGY CONVERTING UNIT FOR AN ENGINE

CROSS REFERENCE TO RELATED APPLICATIONS

The present application is a divisional of U.S. patent application Ser. No. 16/432,833, entitled "METHOD AND SYSTEMS FOR AN ENERGY RECOVERY AND ENERGY CONVERTING UNIT FOR AN ENGINE," and filed on Jun. 5, 2019. U.S. patent application Ser. No. 16/432,833 is a continuation of U.S. patent application Ser. No. 15/199,260, entitled "METHOD AND SYSTEMS FOR AN ENERGY RECOVERY AND ENERGY CONVERTING UNIT FOR AN ENGINE," and filed on Jun. 30, 2016. The entire contents of the above-identified applications are hereby incorporated for all purposes.

BACKGROUND

Technical Field

Embodiments of the subject matter disclosed herein relate to an engine and operation of electrical components of the engine when the engine is not running.

Discussion of Art

An engine system including an engine may include one or more turbochargers for increasing a pressure of intake air delivered to the engine. Each turbocharger may include a turbine disposed in an exhaust passage and a compressor disposed in an intake passage, where exhaust gases flowing through the turbine cause the turbine to rotate and consequently rotate the compressor coupled with the turbine via a shaft. In some examples, an electrical generator may be coupled with the turbocharger or an auxiliary turbine within the exhaust passage. However, energy may only be recovered via the system during engine operation. As a result, when a vehicle in which the engine is installed stops, the engine may continue to operate in idle in order to power one or more electrical loads of the engine. However, engines may have reduced fuel efficiency at idle conditions, thereby increasing fuel consumption and wear on engine components.

BRIEF DESCRIPTION

In one embodiment, a system for an engine comprises: a first turbocharger including a first compressor driven by a first turbine, the first turbine disposed in an exhaust of the engine; a fuel burner fluidly coupled to the exhaust upstream of the first turbine; a generator coupled to one of the first turbine or an auxiliary, second turbine fluidly coupled to the exhaust downstream of the fuel burner; and one or more bypass valves configured to adjust a flow of air that bypasses the engine and is delivered to the fuel burner.

DETAILED DESCRIPTION

The following description relates to embodiments of a system for an engine, comprising: a first turbocharger including a first compressor driven by a first turbine, the first turbine disposed in an exhaust of the engine; a fuel burner fluidly coupled to the exhaust upstream of the first turbine; a generator coupled to one of the first turbine or an auxiliary, second turbine fluidly coupled to the exhaust downstream of the fuel burner; and a first bypass valve configured to adjust a flow of air that bypasses the engine and is delivered to the fuel burner. In one example, the generator is an electrical generator configured to convert rotational energy produced by rotation of a turbine via exhaust gases from the engine into electrical energy. As one example, the generator may be coupled to a shaft of the first turbocharger. As another example, the generator may be coupled to a shaft of an auxiliary turbine (e.g., not coupled to a compressor and therefore not a turbocharger turbine) fluidly coupled to the exhaust of the engine. In one example, the fuel burner may be a device configured to combust fuel injected into the fuel burner, thereby producing exhaust gases. As such, fuel combustion may be equivalent to fuel burning. In another example, the fuel burner may be an energy converter configured to produce exhaust gas when the engine is not operating (e.g., when the engine is off and not combusting fuel within the engine cylinders).

Figure 1:
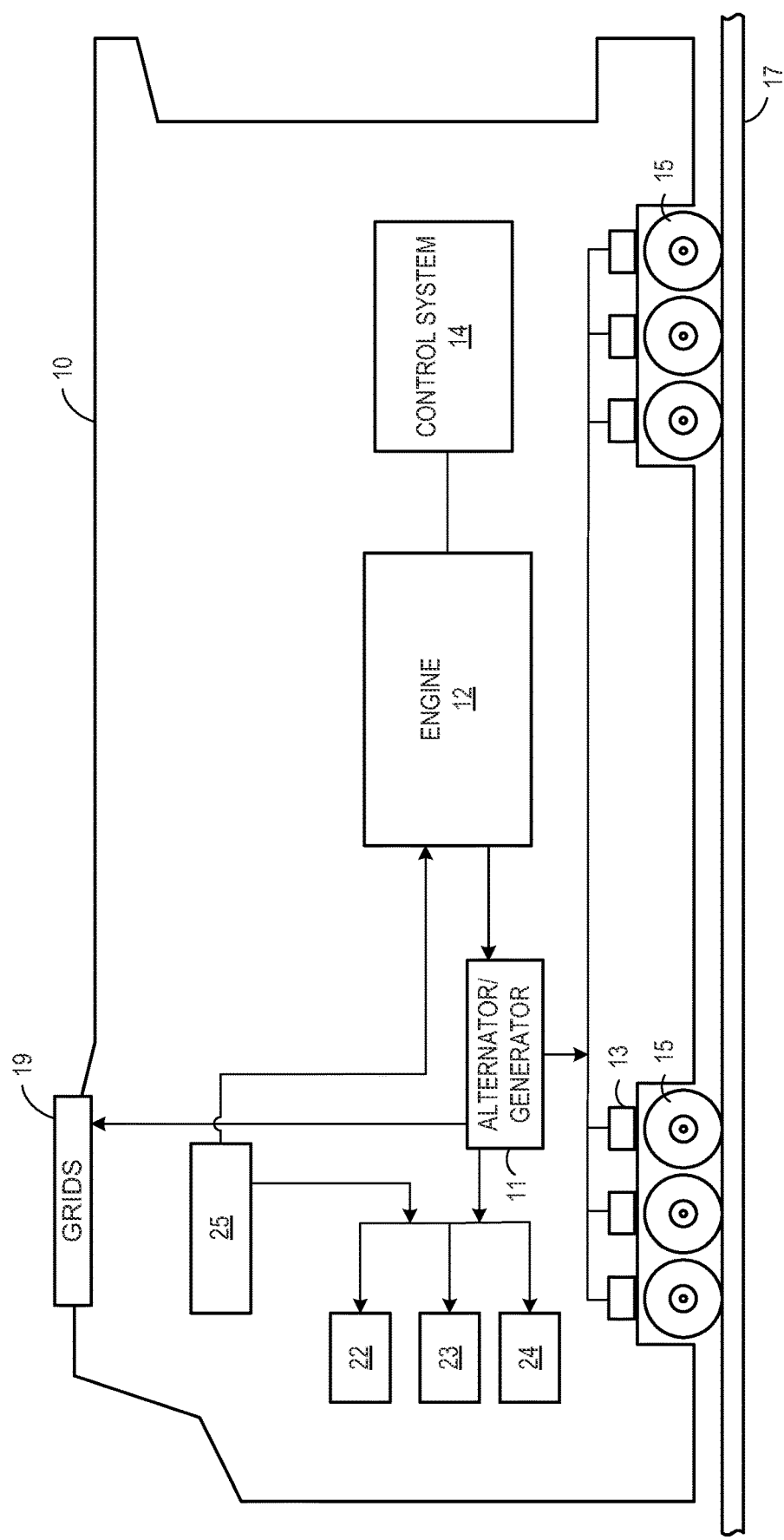
FIG. 1 is a schematic representation of a vehicle, for example, a locomotive, according to an embodiment of the invention.
Figure 2:
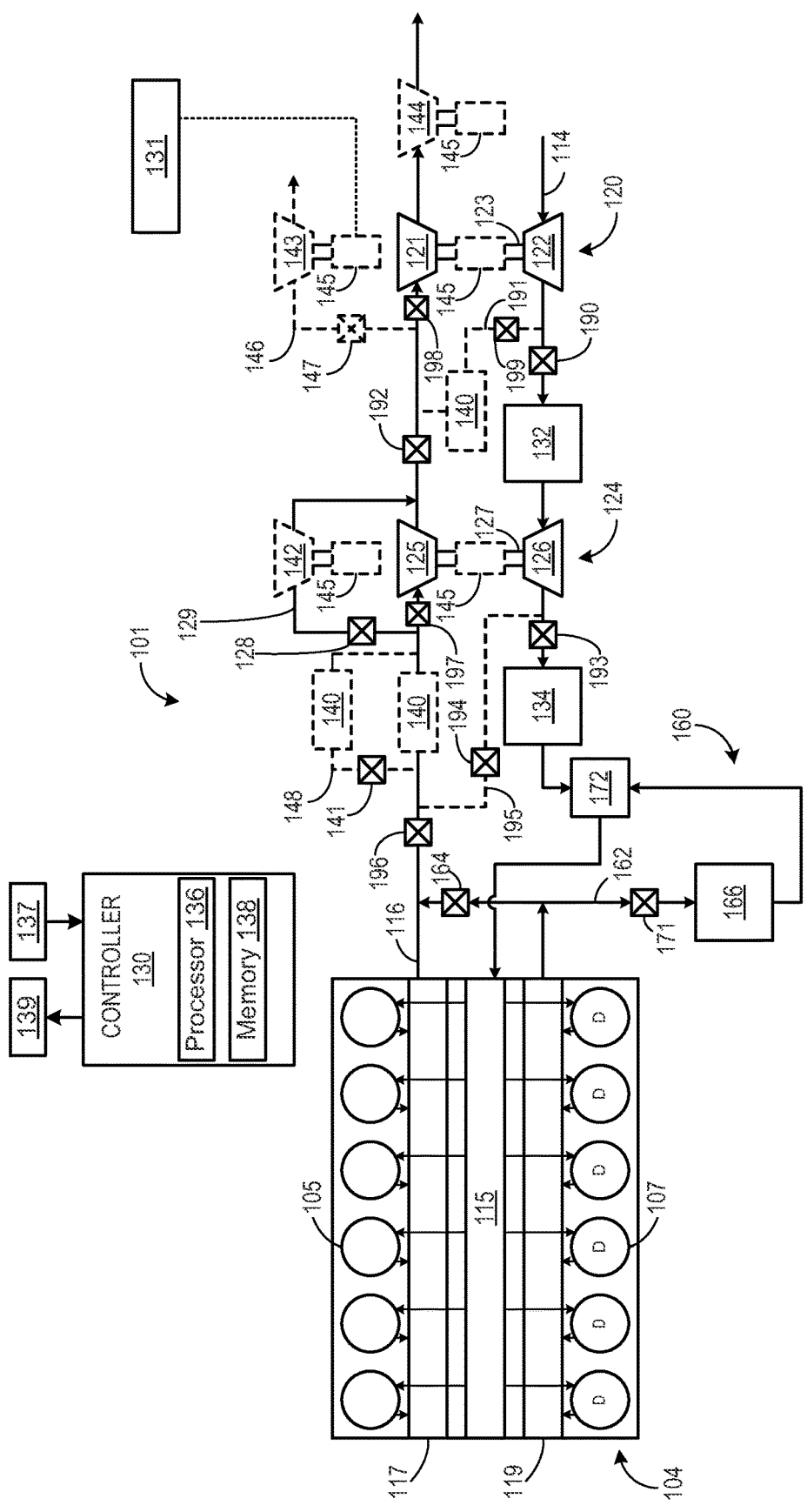
FIG. 2 is a schematic diagram of an engine with an exhaust gas recirculation system and two-stage turbocharger system, according to an embodiment of the invention.
Figure 3:
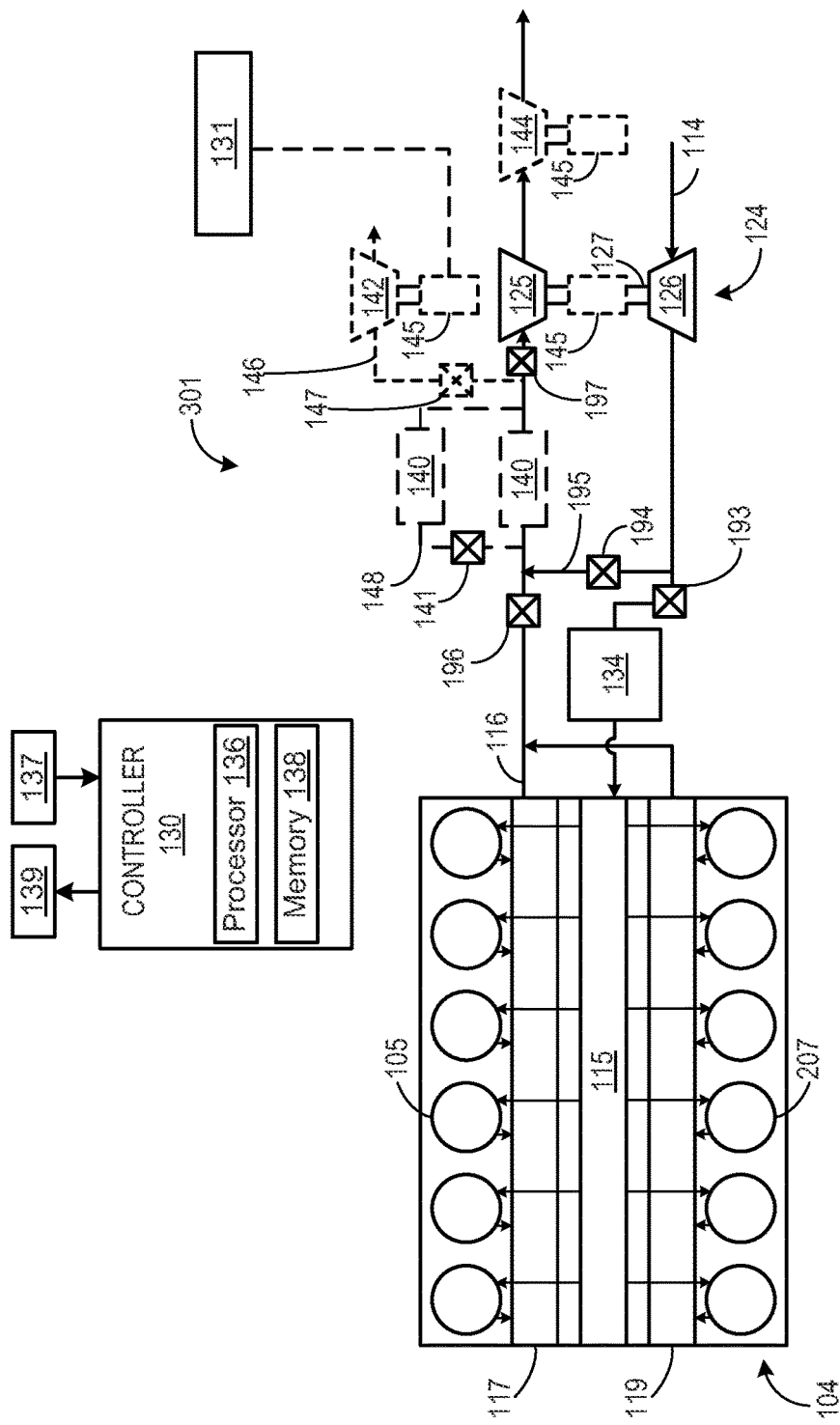
FIG. 3 is a schematic diagram of an engine with a single-stage turbocharger system and an engine bypass passage, according to an embodiment of the invention.

FIG. 1 shows an embodiment of a vehicle in which an engine system may be installed. Energy recovered via a generator may be used to power one or more electrical loads (e.g., electrical components of the engine system), as shown in FIG. 1. In one embodiment, as shown in FIG. 2, the engine system may include a two-stage turbocharger system and an exhaust gas recirculation (EGR) system. In this embodiment, a fuel burner may be fluidly coupled to the exhaust passage, downstream of where the EGR passage connects to the exhaust passage. Further, the engine system shown in FIG. 2 may include an engine bypass passage disposed between the intake and exhaust passages for providing intake air to the fuel burner when the engine is off. The fuel burner may be located within the engine bypass passage or fluidly coupled to the exhaust passage, downstream of where the engine bypass passage connects to the exhaust passage. Additionally, one of the turbochargers of the two-stage turbocharger system or an additional, auxiliary turbine may include a generator coupled thereto (e.g., coupled to a shaft of the turbine). The generator may be configured to recover exhaust energy from the turbine it is coupled to. During engine operation, the turbine-generator may generate energy via exhaust gas resulting from combustion at the cylinders of the engine, as shown in the method presented at FIG. 4. As shown in the method presented at FIG. 4, the engine may be shut down under certain conditions and then the burner may be operated to produce exhaust gas (instead of the engine cylinders). A method for operating the fuel burner to produce exhaust gas, recovering energy from the produced exhaust gas, and powering one or more electrical components of the engine system with the recovered energy is presented at FIG. 5. Additionally, air needed for combustion at the burner to produce exhaust gas may be delivered via the EGR passage by flowing intake air in reverse from the intake passage, through the EGR passage, and to the exhaust passage. In another embodiment, as shown in FIG. 3, the engine system may include a single-stage turbocharger system and no EGR system. However, in alternate embodiments, the system of FIG. 3 may include two turbochargers. The engine system of FIG. 3 also includes an engine bypass passage disposed between the intake and exhaust passages for providing intake air to the fuel burner when the engine is off. In this way, via a turbine-generator, excess exhaust energy from engine combustion may be recovered during engine operation and used to power the engine, turbine, and/or additional electrical components. Additionally, during idle conditions when the engine is stationary, the engine may be shut down and electrical loads (e.g., components) of the engine may still be run via electrical energy from the same turbine-generator (produced via exhaust gases from combustion at the fuel burner and not the engine). As a result, engine fuel consumption may be reduced while maintaining operation of desired electrical components of the engine system.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Referring to FIG. 1, a schematic representation of a vehicle 10 moving from a first operating point to a second operating point along a predefined path is disclosed. In the illustrated embodiment, the vehicle is a rail vehicle, such as a locomotive. For example, as depicted in FIG. 1, the rail vehicle is configured to run on a rail 17 via a plurality of wheels 15. Suitable vehicles include passenger and non-passenger vehicles, hybrid vehicles, off-highway vehicles, on-road vehicles (such as tractor trailers), tracked vehicles, rail vehicles, and the like. The vehicle includes an engine 12 and an exemplary control system 14 coupled to the engine. In one embodiment, the engine may be a dual fuel engine.

In one embodiment, the vehicle is driven by the engine utilizing a plurality of fuels. In the exemplary engine, a reduction in nitrogen oxide (NOx) and particulate matter (PM) emissions is enabled by combusting a relatively larger fraction of the premixed fuel. For example, in some embodiments, diesel and natural gas may be utilized to drive the engine. It should be noted herein that in certain embodiments, the vehicle may also utilize other fuels instead of diesel and natural gas. A ratio of secondary fuel (e.g., natural gas) to total fuel (secondary fuel and primary fuel (e.g., diesel fuel)) delivered to the engine for combustion may be referred to herein as a substitution ratio.

In one embodiment, the rail vehicle is a diesel-electric vehicle. As depicted in FIG. 1, the engine is coupled to an electric power generation system, which includes an alternator/generator 11 and electric traction motors 13. For example, the engine is a diesel and/or natural gas engine that generates a torque output that is transmitted to the alternator/generator which is mechanically coupled to the engine.

The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 19. The resistive grids may be configured to dissipate excess engine torque via heat produced by the grids from electricity generated by alternator/generator. In alternate embodiments, excess engine torque may be dissipated to an alternate component, such as an energy storage device or additional electrical components 22, 23, and 24. As an example, and as shown in FIG. 1, the additional electrical components powered by the alternator/generator may include one or more of compressors, blowers, batteries, and controllers (such as a controller of the control system or additional vehicle controllers).

The vehicle additionally includes a turbine-generator 25. The turbine generator may include an electrical generator coupled to a shaft of a turbine adapted to rotate via exhaust passing through the turbine. Further details of the turbine-generator (also referred to herein as a generator) are described below in reference to FIGS. 2-5. Example positioning of the turbine-generator in an engine system is shown in FIGS. 2 and 3. As shown in FIG. 1, the turbine-generator is electrically coupled to the additional electrical components of the vehicle (which may include the engine control system). As described further below, when the engine is off (e.g., shut down and not combusting fuel to produce exhaust gas), the turbine-generator may still produce energy via exhaust energy provided via a fuel burner (shown in FIGS. 2 and 3). Energy may then be provided to the electrical components of the vehicle, while the engine is off, from the turbine-generator. The turbine-generator may also be coupled to the engine to provide power to the engine during engine operation, as shown in FIG. 1.

The control system 14 is configured to adjust exhaust flow to the turbine-generator during engine operation (e.g., via one or more valves, as explained further below with reference to FIGS. 2-3). Additionally, the control system is configured to adjust one or more engine bypass valves to flow intake air to a fuel burner disposed with an exhaust of the engine, operate the fuel burner to produce exhaust gas when the engine is off (e.g., via injecting fuel into the fuel burner), recover energy from the produced exhaust via the turbine-generator, and actuate the turbine-generator to provide power to one or more electrical components while the engine is off. The control system and methods for controlling the turbine-generator and fuel burner of the engine are explained in greater detail below with reference to subsequent figures.

FIG. 2 presents a block diagram of an exemplary embodiment of an engine system 101 with an engine 104 (similar to engine 12 described above with reference to FIG. 1). The engine receives intake air for combustion from an intake, such as an intake manifold 115. The intake may be any suitable conduit or conduits through which gases flow to enter the engine. For example, the intake may include the intake manifold, the intake passage 114, and the like. The intake passage may receive ambient air from an air filter (not shown) that filters air from outside of a vehicle in which the engine may be positioned (such as vehicle 10 shown in FIG. 1). Exhaust gas resulting from combustion in the engine is supplied to an exhaust, such as the exhaust passage 116. The exhaust may be any suitable conduit through which gases flow from the engine. For example, the exhaust may include an exhaust manifold, the exhaust passage, and the like. Exhaust gas flows through the exhaust passage. In one embodiment, the exhaust passage includes a NOx and/or oxygen sensor for measuring a NOx and oxygen level of the exhaust gas.

In the example embodiment depicted in FIG. 2, the engine is a V-12 engine having twelve cylinders. In other examples, the engine may be a V-6, V-8, V-10, V-16, I-4, I-6, I-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders. In another example, the engine may not include any donor cylinders and instead exhaust from all the engine cylinder may be routed to a common exhaust passage (for example, an EGR system as described further below may be coupled to at least a portion of the common exhaust passage).

As depicted in FIG. 2, the non-donor cylinders are coupled to the exhaust passage to route exhaust gas from the engine to atmosphere (after it passes through first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

In the example embodiment shown in FIG. 2, when a second valve 171 is open, exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Further, the EGR system includes a first valve (which may be referred to herein as a bypass valve) 164 disposed between the exhaust passage and the EGR passage. The second valve may be an on/off valve controlled by the controller 130 (for turning the flow of EGR on or off), or it may control a variable amount of EGR, for example. In some examples, the first valve may be actuated such that an EGR amount is reduced (exhaust gas flows from the EGR passage to the exhaust passage). In other examples, the first valve may be actuated such that the EGR amount is increased (e.g., exhaust gas flows from the exhaust passage to the EGR passage). In some embodiments, the EGR system may include a plurality of EGR valves or other flow control elements to control the amount of EGR.

In such a configuration, during engine operation (e.g., when the engine cylinders are combusting), the first valve is operable to route exhaust from the donor cylinders to the exhaust passage of the engine and the second valve is operable to route exhaust from the donor cylinders to the intake passage of the engine. Additionally, when the engine is off and not combusting fuel, the first valve and second valve may be operable to route intake air from the intake passage to the exhaust passage (e.g., in a reverse direction through the EGR passage). This operation of the first and second valves of the EGR system during engine off periods is discussed further below.

In the example embodiment shown in FIG. 2, the first valve and the second valve may be engine oil, or hydraulically, actuated valves, for example, with a shuttle valve (not shown) to modulate the engine oil. In some examples, the valves may be actuated such that one of the first and second valves and is normally open and the other is normally closed. In other examples, the first and second valves and may be pneumatic valves, electric valves, or another suitable valve.

As shown in FIG. 2, the engine system further includes an EGR mixer 172 which mixes the recirculated exhaust gas with charge air such that the exhaust gas may be evenly distributed within the charge air and exhaust gas mixture. In the example embodiment depicted in FIG. 2, the EGR system is a high-pressure EGR system which routes exhaust gas from a location upstream of the turbochargers in the exhaust passage to a location downstream of the turbochargers in the intake passage. In other embodiments, the engine system may additionally or alternatively include a low-pressure EGR system which routes exhaust gas from downstream of the turbochargers in the exhaust passage to a location upstream of the turbochargers in the intake passage. Additionally, in some embodiments, the engine system may not include the EGR mixer.

As depicted in FIG. 2, the engine system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The second turbocharger operates at a relatively higher pressure, and includes a second turbine 125 which drives a second compressor 126. The second turbine and the second compressor are mechanically coupled via a second shaft 127. In the example embodiment shown in FIG. 2, the second turbocharger is provided with a wastegate 128 disposed in a second bypass passage 129 which allows exhaust gas to bypass the second turbocharger. The wastegate may be opened, for example, to divert the exhaust gas flow away from the second turbine. In this manner, the rotating speed of the compressors, and thus the boost provided by the turbochargers to the engine may be regulated during steady state conditions. In another embodiment, the wastegate may be a three-way valve disposed at the junction between the exhaust passage and the second bypass passage. As such, the wastegate may be adjusted to increase flow through the second bypass passage and reduce flow to the second turbocharger. In other embodiments, each of the turbochargers may be provided with a wastegate, or only the second turbocharger may be provided with a wastegate.

As explained above, the terms "high pressure" and "low pressure" are relative, meaning that "high" pressure is a pressure higher than a "low" pressure. Conversely, a "low" pressure is a pressure lower than a "high" pressure.

The engine system further includes a turbine-generator (such as the turbine-generator 25 shown in FIG. 1). The turbine-generator includes an electrical generator 145 coupled to a shaft of a turbine. Exhaust passing through the turbine rotates the turbine and, in turn, rotates the shaft. The generator coupled to the shaft then converts the rotational energy to electrical energy. The generator is electrically coupled to one or more electrical components 131 of the engine system or vehicle. As described above, the one or more electrical components may include one or more heaters, compressors, blowers, batteries, controllers (which may include controller 130). The generator may also provide electrical power to the engine to assist in cranking the engine.

FIG. 2 shows a plurality of alternate locations that the generator 145 may be positioned. In one embodiment, the engine system may only include one generator coupled to any one of the locations shown in FIG. 2. In alternate embodiments, the engine system may include two or more generators coupled to two or more of the locations shown in FIG. 2. As shown in FIG. 2, the generator may be coupled to the first shaft of the first turbocharger or the second shaft of the second turbocharger. The engine system may include an additional, auxiliary turbine that is not coupled with a compressor (and thus not a turbocharger turbine). For example, as shown in FIG. 2, a first auxiliary turbine 142 may be positioned in the second bypass passage around the second turbine. As such, the first auxiliary turbine is positioned in parallel with the second turbine. The wastegate in the second bypass passage may control an amount of exhaust gas flowing through the first auxiliary turbine. Further, as shown in FIG. 2, the exhaust passage may include a first auxiliary valve 197 to control the amount of exhaust gas flowing through the first auxiliary turbine (for example, the first auxiliary valve may be closed to divert all exhaust through the first auxiliary turbine when the engine is off, as described further below). In another example, as shown in FIG. 2, a second auxiliary turbine 143 may be positioned in a first bypass passage 146 around the first turbine. As such, the second auxiliary turbine is positioned in parallel with the first turbine. The first bypass passage includes a first bypass valve 147 configured to control an amount of exhaust gas flowing through the second auxiliary turbine. In some examples, the engine may include an additional valve disposed in the exhaust passage, such as second auxiliary valve 198, or the first bypass valve may be a three-way valve disposed at the junction between the exhaust passage and the first bypass passage, to control the amount of exhaust gas flowing to first turbine arranged in parallel with the second auxiliary turbine. In yet another example, as shown in FIG. 2, a third auxiliary turbine 144 is disposed in the exhaust passage, downstream of the first turbine and second turbine. Thus, the third auxiliary turbine is positioned in series with the first turbine and second turbine. The engine system may include none or one or more of the first, second, and third auxiliary turbines. The generator may be coupled to the first, second, or third auxiliary turbines via a shaft of the corresponding turbine. As such, the engine system may include a turbine-generator including any one of or one or more of: the first turbine 121 and generator; the second turbine 125 and generator; the first auxiliary turbine 142 and generator; the second auxiliary turbine 143 and generator; and the third auxiliary turbine 144 and generator.

The engine system further includes a fuel burner 140 fluidly coupled to the exhaust passage. As shown in FIG. 2, the fuel burner 140 may be coupled directly in the exhaust passage such that all exhaust gases flowing through the exhaust passage pass through the fuel burner. Alternatively, the fuel burner may be disposed in a bypass passage 148, the bypass passage directly coupled to the exhaust passage. In this embodiment, the bypass passage may include a bypass valve 141 configured to adjust an amount of exhaust flowing from the exhaust passage and through the fuel burner. In yet another embodiment, the fuel burner may be disposed within a second engine bypass passage 191, as described further below. The fuel burner may include a fuel injector for injecting fuel into a combustion chamber of the fuel burner. The fuel burner may additionally include a spark plug or alternate means of burning the injected fuel and air within the fuel burner. In this way, the fuel burner is adapted to burn (e.g., combust) air and fuel within the fuel burner to produce exhaust gas.

The engine system further includes an engine bypass passage coupled between the intake passage and exhaust passage of the engine. FIG. 2 shows two alternate locations for the engine bypass passage. As one example, the engine bypass passage may be first engine bypass passage 195 with a first end of the first engine bypass passage coupled to the intake passage, downstream of the second compressor and a second end of the first engine bypass passage coupled to the exhaust passage, upstream of the fuel burner, second turbine, and one or more auxiliary turbines. A first engine bypass valve 194 is positioned within the engine bypass passage and operable to control a flow of intake air from the intake passage to the exhaust passage when the engine is off and not combusting fuel (e.g., the controller may actuate the engine bypass valve to adjust an amount of air flowing to the fuel burner for combustion when the engine is not operating). Additionally, the intake passage may include a second engine bypass valve 193 disposed in the intake passage, downstream of the first end of the first engine bypass passage and upstream of the charge air cooler 134. The exhaust passage may also include a third engine bypass valve 196 disposed in the exhaust passage, upstream of the second end of the first engine bypass passage. During engine operation, the controller may maintain the first engine bypass valve in a closed position and the second and third engine bypass valves in an open position to reduce the flow of air between the exhaust passage and intake passage via the first engine bypass passage while allowing intake airflow to the engine for combustion. When the engine is off, the controller may open the first engine bypass valve while closing the second and third engine bypass valves in order to flow intake air to the fuel burner and not flow intake air to the engine. A method for directing intake air to the fuel burner when the engine is shut down is described further below with reference to FIG. 5.

As another example, the engine bypass passage may be second engine bypass passage 191 with a first end of the second engine bypass passage coupled to the intake passage, downstream of the first compressor and a second end of the second engine bypass passage coupled to the exhaust passage, upstream of the first turbine and one or more auxiliary turbines. In this embodiment, the fuel burner 140 is disposed within the second engine bypass passage. Additionally, in this embodiment, the intake passage may include a fourth engine bypass valve 190 disposed in the intake passage, downstream of the first end of the second engine bypass passage and upstream of both charge air coolers (if there are two). The exhaust passage may also include a fifth engine bypass valve 192 disposed in the exhaust passage, upstream of the second end of the first engine bypass passage. During engine operation, the controller may maintain the fuel burner off (and closed to airflow) and the fourth and fifth engine bypass valves in an open position to reduce the flow of air between the exhaust passage and intake passage via the second engine bypass passage while allowing intake airflow to the engine for combustion. For example, the second engine bypass passage may include a bypass passage valve 199 for adjusting air flow through the second engine bypass passage (e.g., such as closing the bypass passage valve in the second engine bypass passage during engine operation to block flow through the second engine bypass passage). When the engine is off, the controller may operate the fuel burner while opening the bypass passage valve and closing the fourth and fifth engine bypass valves in order to flow intake air through the fuel burner (and exhaust gas from the fuel burner to the turbine-generator) and not flow intake air or produced exhaust gas to the engine. In both embodiments of the engine bypass passage shown in FIG. 2, the intake air is routed directly from an outlet of one of the compressors and to an inlet of the fuel burner. This routing may increase the thermodynamic performance of the fuel burner.

The engine system further includes a controller 130 (e.g., may also be referred to as a control system, such as control system 14 of FIG. 1) to control various components related to the vehicle system. In one example, the controller includes a computer control system. In one embodiment, the computer control system includes a processor, such as processor 136. The controller may include multiple engine control units (ECU) and the control system may be distributed among each of the ECUs. The controller further includes computer readable storage media, such as memory 138, including instructions for enabling on-board monitoring and control of rail vehicle operation. The memory may include volatile and non-volatile memory storage.

The controller may oversee control and management of the vehicle system. The controller may receive signals from a variety of engine sensors 139 to determine operating parameters and operating conditions, and correspondingly adjust various engine actuators 137 to control operation of the vehicle. For example, the controller may receive signals from various engine sensors including engine speed, engine load, boost pressure, exhaust pressure, ambient pressure, exhaust temperature, etc. Correspondingly, the controller may control the vehicle system by sending commands to various components such as traction motors, alternator, cylinder valves, throttle, etc.

As one example, during engine operation (e.g., when the engine is on and combusting fuel at the engine cylinders) the controller may receive signals from one or more engine sensors (e.g., such as an engine speed sensor, engine load sensor, or turbocharger speed sensor) and determine that engine assist is desired. As such, the controller may operate the turbine-generator to produce energy and provide the produced energy to the engine via actuating one or more valves (such as wastegate 128, first bypass valve 147, first valve 164, first auxiliary valve 197, second auxiliary valve 198, and/or second valve 171) to direct exhaust gas to the turbine of the turbine-generator. During engine operation, if the fuel burner is positioned in the bypass passage, the controller may additionally close the bypass valve of the bypass passage to reduce exhaust gas flowing through the fuel burner.

The controller may additionally stop operating the engine (via stopping injecting and combusting fuel at the engine cylinders) in response to the engine being stationary (e.g., the vehicle in which the engine system is installed being stationary). Alternatively, if the engine is a stationary engine, the controller may stop operating the engine in response to only needing to supply auxiliary electrical power and not combustive power. As introduced above, when the engine is off and not combusting fuel, the controller may actuate one or more engine bypass valves to route intake air from the intake passage to the exhaust passage. In an alternate embodiment, during this condition, the controller may actuator the first valve 164 and second valve 171 to route intake air from the intake passage to the exhaust passage. Additionally, while the engine is off, the controller may direct the intake air to the fuel burner and operate the fuel burner to produce exhaust gas (e.g., via turning on the fuel burner and/or actuating one or more actuators of the fuel burner to inject fuel and combust fuel and air within the fuel burner). Further still, while the engine is off, the controller may direct exhaust gas from the fuel burner to the turbine-generator (e.g., via actuating one or more valves controlling exhaust flow to the turbine of the turbine-generator as explained above). The controller may also send signals to the generator of the turbine-generator to provide electrical energy to one or more electrical components based on electrical loads of the one or more electrical components.

FIG. 3 shows an alternate configuration of an engine system 301 that may be used in a vehicle, such as vehicle 10 shown in FIG. 1. The engine system shown in FIG. 3 only includes a single turbocharger and does not include an EGR system. However, in alternate embodiments, the engine system may include an EGR system or additional turbochargers. The engine system shown in FIG. 3 includes similar components to that of engine system 101 shown in FIG. 2. As such, similar components have been numbered similarly in FIG. 3 and will not be re-described below if already introduced above with reference to FIG. 2.

In the example embodiment depicted in FIG. 3, the engine is a V-12 engine having twelve cylinders. In other examples, the engine may be a V-6, V-8, V-10, V-16, I-4, I-6, I-8, opposed 4, or another engine type. As depicted, the engine includes a first set of cylinders 105, which includes six cylinders that supply exhaust gas exclusively to a first cylinder exhaust manifold 117, and another subset of cylinders 207, which includes six cylinders that supply exhaust gas exclusively to a second cylinder exhaust manifold 119. All the engine cylinders are coupled to the exhaust passage 116 and thus route exhaust gas from the engine to atmosphere (after it passes through turbocharger 124).

As depicted in FIG. 3, the engine system further includes a single-stage turbocharger with the turbocharger 124 arranged between the intake passage and the exhaust passage. The turbocharger includes a turbine 125 which drives a compressor 126. The turbine and the compressor are mechanically coupled via a shaft 127.

The engine system further includes a turbine-generator (such as the turbine-generator 25 shown in FIG. 1 and the turbine-generator described above with reference to FIG. 2). The turbine-generator includes an electrical generator 145 coupled to a shaft of a turbine. The turbine-generator of FIG. 3 may operate similarly to the turbine-generator of FIG. 2, as described above.

FIG. 3 shows a plurality of alternate locations that the generator 145 may be positioned. In one embodiment, the engine system may only include one generator coupled to any one of the locations shown in FIG. 3. In alternate embodiments, the engine system may include two or more generators coupled to two or more of the locations shown in FIG. 3. As shown in FIG. 3, the generator may be coupled to the shaft of the turbocharger. The engine system may include an additional, auxiliary turbine that is not coupled with a compressor (and thus not a turbocharger turbine). For example, as shown in FIG. 3, a first auxiliary turbine 142 may be positioned in a first bypass passage 146 around the turbine of the turbocharger. As such, the first auxiliary turbine is positioned in parallel with the turbocharger turbine. The first bypass passage includes a first bypass valve 147 configured to control an amount of exhaust gas flowing through the first auxiliary turbine. In another example, as shown in FIG. 3, a second auxiliary turbine 144 is disposed in the exhaust passage, downstream of the turbocharger turbine. Thus, the second auxiliary turbine is positioned in series with the turbocharger turbine. The engine system may include none or one or more of the first and second auxiliary turbines. The generator may be coupled to the first or second auxiliary turbines via a shaft of the corresponding turbine. As such, the engine system may include a turbine-generator including any one of or one or more of: the turbocharger turbine 125 and generator; the first auxiliary turbine 142 and generator; and the second auxiliary turbine 144 and generator.

The engine system further includes a fuel burner 140 and controller 130, as described above with reference to FIG. 3. Additionally, the engine system of FIG. 3 includes an engine bypass passage 195 disposed between the intake passage and exhaust passage. Specifically, a first end of the engine bypass passage is coupled to the intake passage, downstream of the turbocharger compressor and a second end of the engine bypass passage is coupled to the exhaust passage, upstream of the fuel burner, turbocharger turbine, and one or more auxiliary turbines. A first engine bypass valve 194 is positioned within the engine bypass passage and operable to control a flow of intake air from the intake passage to the exhaust passage when the engine is off and not combusting fuel (e.g., the controller may actuate the first engine bypass valve to adjust an amount of air flowing to the fuel burner for combustion when the engine is not operating). Additionally, the intake passage may include a second engine bypass valve 193 disposed in the intake passage, downstream of the first end of the first engine bypass passage and upstream of the charge air cooler 134. The exhaust passage may also include a third engine bypass valve 196 disposed in the exhaust passage, upstream of the second end of the first engine bypass passage. During engine operation, the controller may maintain the first engine bypass valve in a closed position and the second and third engine bypass valves in an open position to reduce the flow of air between the exhaust passage and intake passage via the first engine bypass passage while allowing intake airflow to the engine for combustion. When the engine is off, the controller may open the first engine bypass valve while closing the second and third engine bypass valves in order to flow intake air to the fuel burner and not flow intake air to the engine. A method for directing intake air to the fuel burner when the engine is shut down is described further below with reference to FIG. 5. In an alternate embodiment, the first engine bypass valve may be a three-way valve positioned at the junction between the engine bypass passage and the intake passage and the intake passage may then not include the second engine bypass valve.

Figure 4:
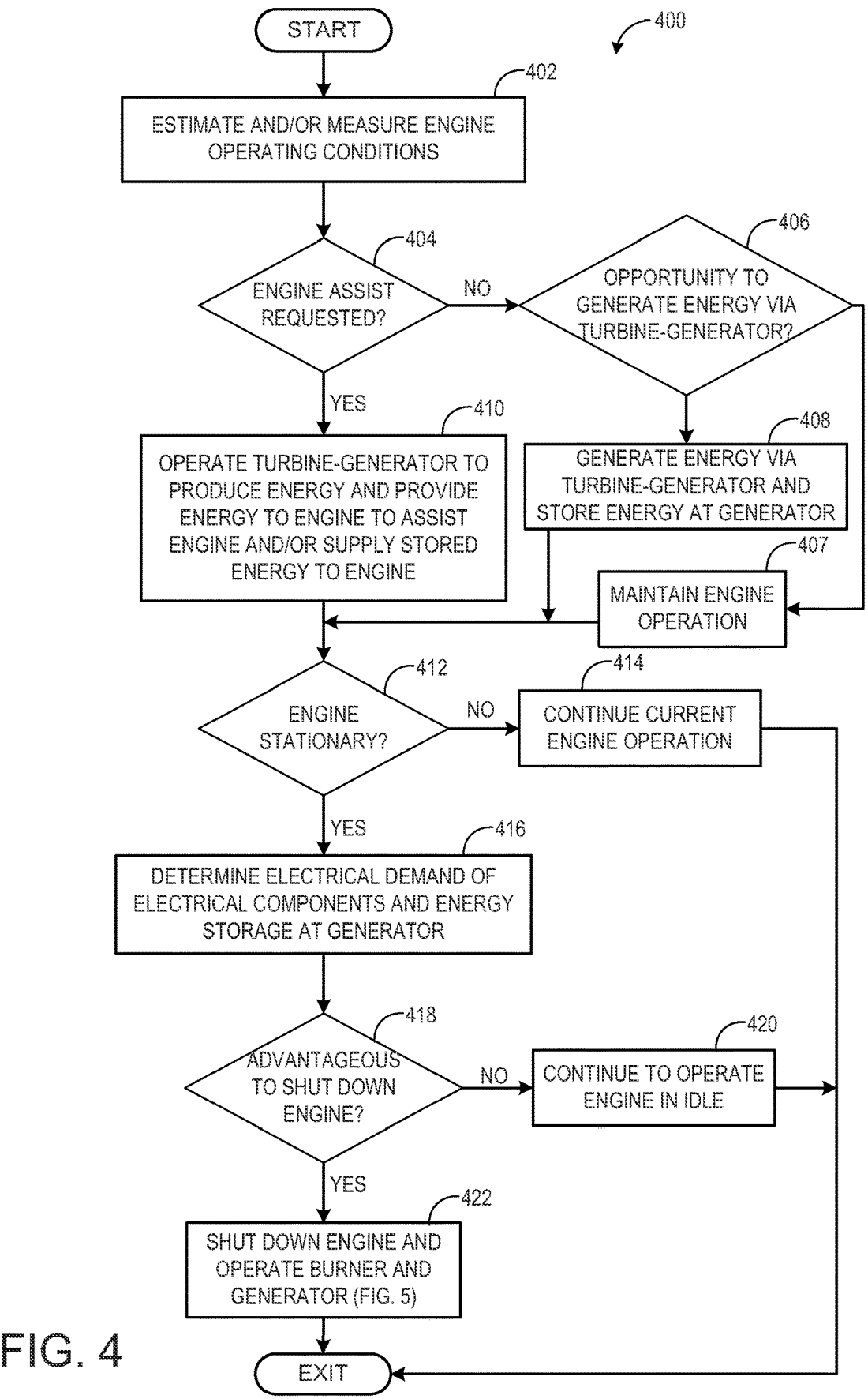
FIG. 4 is a flow chart showing a method for operating a turbine-generator during engine operation, according to an embodiment of the invention.

Turning to FIG. 4, a flow chart of a method 400 for operating a turbine-generator during engine operation is shown. As one example, the turbine-generator is one of the turbine-generators described above with reference to FIG. 2 and FIG. 3. Method 400 also presents a method for shutting down the engine under certain conditions. Method 400 and the rest of the methods described herein may be executed by an engine controller (such as controller 130 shown in FIGS. 2-3) according to instructions stored on a memory of the controller, in combination with various sensors and actuators of the engine system (such as engine system 101 shown in FIG. 2 or engine system 301 shown in FIG. 3).

At 402, the method includes estimating and/or measuring engine operating conditions. Engine operating conditions may include engine speed and/or load, engine temperature, an electrical load of one or more engine or vehicle electrical components, a speed of a vehicle in which the engine system is installed, turbocharger speed, a rotational speed of a turbine-generator, or the like. At 404, the method includes determining if engine assistance is needed. In one example, the controller may determine that engine assistance is needed in response to engine load and an amount of energy stored at the generator. For example, the controller may determine that engine assistance is needed when engine load is over a threshold load and there is a threshold amount of energy stored at the generator.

If energy assistance at the engine is not requested, the method continues to 406 to determine whether there is an opportunity to generate energy with the turbine-generator. In one example, the controller may determine that there is an opportunity to generate energy with the turbine-generator when the turbine-generator includes a turbine disposed directly in the exhaust passage (e.g., not in a bypass passage arranged in parallel with the exhaust passage) and exhaust is flowing through the turbine. In another example, the controller may determine that there is an opportunity to generate energy with the turbine-generator when the turbine-generator includes a turbine disposed in a bypass passage around the turbocharger turbine and a speed of the turbocharger turbine is greater than desired for torque demand. If there is not an opportunity to generate energy via the turbine-generator, the method continues to 407 to maintain current engine operation. Alternatively at 406, if there is an opportunity to generate energy via the turbine-generator, the method continues to 408 to generate energy via the turbine-generator and store energy at the generator. The method at 408 may include directing exhaust gas flow to the turbine of the turbine-generator via adjusting one or more valves disposed upstream of the turbine (e.g., such as adjusting bypass valve 128 if the turbine-generator includes turbine 142, as shown in FIG. 2). The rotational energy of the turbine and turbine shaft may then be converted to electrical energy by the generator. From 408 and 407, the method continues to 412, as described further below. In some examples, method 400 may further include, in response to the speed of the turbocharger turbine being less than desired for torque demand, supplying energy from the generator to the turbocharger turbine to increase the speed of the turbocharger turbine.

Returning to 404, if engine assist is requested, the method continues to 410 to operate the turbine-generator to produce energy and provide the produced energy to the engine to assist the engine (e.g., via providing cranking assistance) and/or supply stored energy from the generator to the engine. The method at 410 may include directing exhaust gas to the turbine of the turbine-generator in order to increase rotation of the turbine and recover the rotational energy at the generator. At 412, the method includes determining if the engine is stationary. In one example, the controller may determine that the engine is stationary if vehicle speed of a vehicle in which the engine is installed is less than a threshold speed. In one example, the threshold speed may be approximately zero. In another example, the threshold speed may be greater than zero. If the engine is stationary, engine combustion may not be required for propelling the vehicle. The method at 412 may additionally or alternatively include determining whether a demanded power level (e.g., operator demanded power level) of the engine is less than a threshold. For example, the threshold power level may be a level at which combustion of fuel at the engine is not required to support one or more power demands of the engine.

If the engine is not stationary and/or the demanded power level is greater than the threshold, the method continues to 414 to continue current engine operation and then the method ends. Alternatively, if the engine is stationary and/or the demanded power level is at or less than the threshold, the method continues to 416 to determine the electrical demand of one or more electrical components of the engine and/or vehicle and an amount of energy stored at the generator of the turbine-generator (e.g., a storage level of a battery of the generator).

At 418, the method includes determining if it is advantageous to shut down the engine. For example, when the engine is stationary, the engine may operate in idle and continue to consume fuel. However, operating the engine in idle may result in reduced fuel economy and increased stress on engine components, as well as increased emissions. Alternatively, the engine may be shut down and therefore stop injecting fuel and combusting the injected fuel. This may reduce fuel consumption and emissions of the engine. In one example, it may be advantageous to shut down the engine if the electrical loads of the one or more electrical components are greater than a threshold level. In another example, it may be advantageous to shut down the engine if the fuel savings from not combusting fuel at the engine cylinders outweighs the fuel usage in running the fuel burner to power the electrical loads. In yet another example, it may not be advantageous to shut down the engine if the only electrical load to be powered while the engine is stationary is an electrical load of a heater (e.g., to heat the vehicle cabin). If the controller determines that it is not advantageous to shut down the engine, the method continues to 420 to continue to operate the engine in idle. Alternatively, if the controller determines that it is advantageous to shut down the engine, the method continues to 422 to shut down the engine and operate the fuel burner and turbine-generator to produce and supply electrical energy to the one or more electrical components and/or supply power to additional components using the produced exhaust energy. The method at 422 is expanded upon in method 500 of FIG. 5, as discussed further below.

Figure 5:
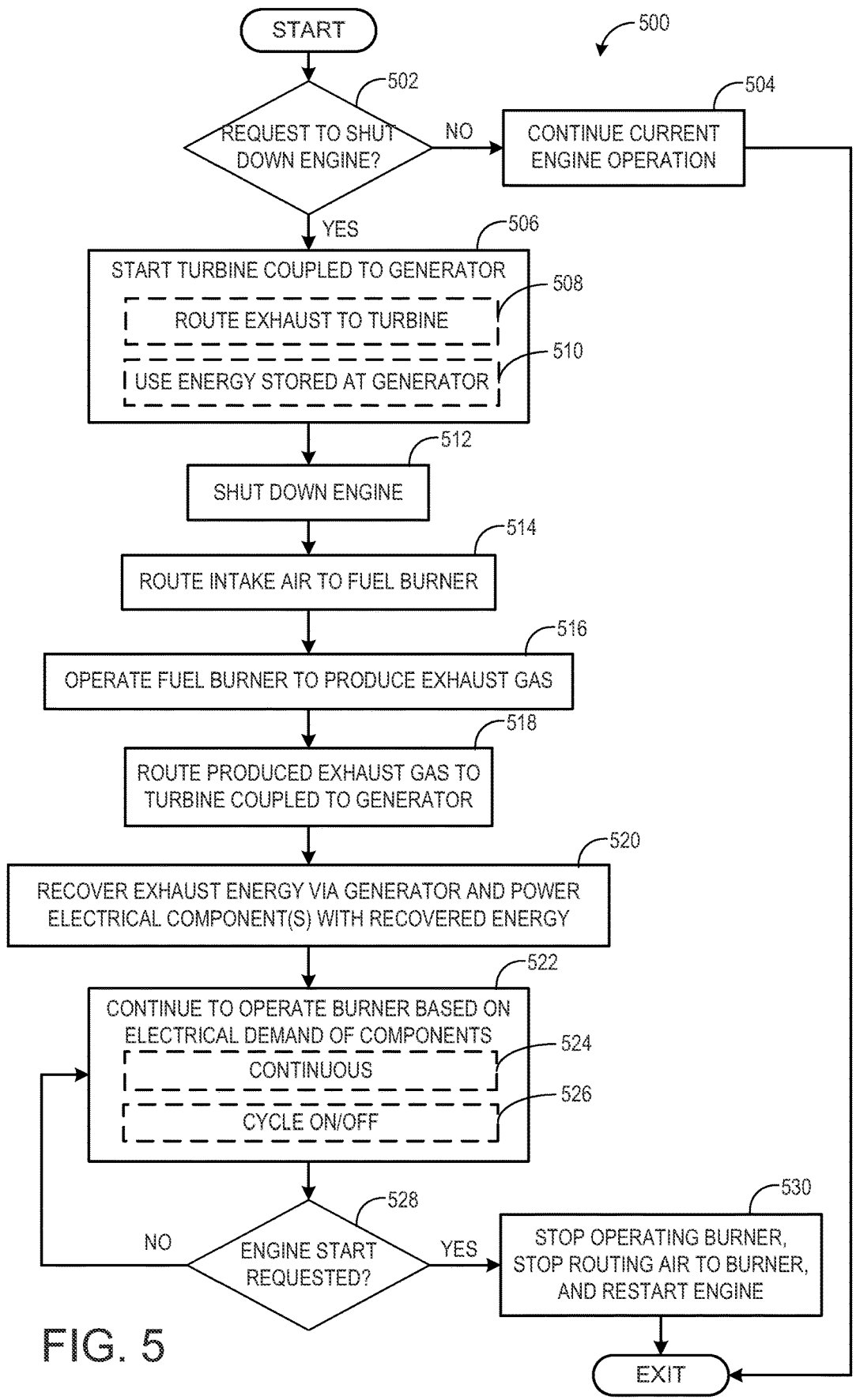
FIG. 5 is a flow chart showing a method for operating a fuel burner and a turbine-generator and powering one or more electrical components when an engine is not operating, according to an embodiment of the invention.

FIG. 5 shows a flow chart of a method 500 for operating the fuel burner to produce exhaust gas, recovering energy from the produced exhaust gas via the turbine-generator, and powering one or more electrical components of the engine system with the recovered energy. Method 500 may continue from method 400 presented at FIG. 4. As explained above, the turbine-generator may be one of the turbine-generators shown in FIG. 2 or 3. Additionally, the fuel burner may be a fuel burner disposed in an engine bypass passage or an exhaust passage, upstream of the turbine-generator, such as one of the fuel burners 140 shown in FIG. 2 or 3. The engine bypass passage (such as the EGR passage 162 shown in FIG. 2 or engine bypass passages 195 or 191 shown in FIGS. 2 and 3) for directing intake air from the intake passage to the exhaust passage, upstream of the fuel burner, in order to provide air to the burner for combusting fuel and producing exhaust gas.

Method 500 starts at 502 where the method includes determining if there is a request to shut down the engine and operate the fuel burner and turbine-generator to produce electrical energy (similar to as explained above at 418, 420, and 422 of method 400). If there is not a request to shut down the engine, the method continues to 504 to continue the current engine operation and not shut down the engine. Alternatively, if there is a request to shut down the engine, the method continues to 506. At 506, the method includes starting (e.g., starting rotation of) the turbine coupled to the generator (e.g., starting the turbine of the turbine-generator). In one example, as shown at 508, starting the turbine coupled to the generator may include routing exhaust gas from the engine cylinders (before shutting down the engine) to the turbine of the turbine-generator in order to increase the speed of the turbine. Routing exhaust gas from the engine cylinders to the turbine of the turbine-generator may include actuating one or more valves disposed in the exhaust passage or bypass passages in which the turbine-generator is installed to increase exhaust flow to the turbine-generator. In another example, as shown at 508, starting the turbine coupled to the generator may include using energy stored at the generator to rotate the shaft of the turbine and thus increase the speed of the turbine. The method then continues to 512 to shut down the engine. Shutting down the engine may include stopping injecting fuel in the engine cylinders and stopping combustion at the engine cylinders. As a result, no more exhaust gas may be produced by the engine cylinders.

At 514, the method includes routing intake air to the fuel burner. In one example, routing intake air to the fuel burner may include actuating a valve disposed in an engine bypass passage disposed between the intake passage and exhaust passage (and one or more valves disposed in the intake passage and/or exhaust passage proximate to the engine bypass passage) to increase a flow of intake air through the engine bypass passage and to the fuel burner. As one example, actuating the valve disposed in the engine bypass passage may include actuating the valve to increase an opening of the valve (e.g., moving the valve from a closed to open position) and actuating the valve(s) disposed in the intake passage and/or exhaust passage proximate to the engine bypass passage may include actuating the valve(s) to decrease the opening of the valve (s) (e.g., moving the valves from an open to a closed position). In one example, the valve(s) disposed in the intake passage and/or exhaust passage proximate to the engine bypass passage may include valves 193 and 196 shown in FIGS. 2 and 3 or valves 190 and 192 shown in FIG. 2. In one example, the engine bypass passage may be an EGR passage including one or more EGR valves and/or an EGR cooler, such as the EGR passage 162 shown in FIG. 2. In another example, the engine bypass passage may be one of engine bypass passages 191 or 195 shown in FIG. 2 or 3. Further, a first end of the engine bypass passage may be coupled to the intake passage and a second end of the engine bypass passage may be coupled to the exhaust passage upstream of the fuel burner. As a result, intake air flowing through the engine bypass passage is directed to the fuel burner. In one example, when the fuel burner is disposed in a bypass passage arranged in parallel with the main exhaust passage, the method at 514 further includes adjusting a valve disposed in the exhaust passage and/or bypass passage to direct intake air to the fuel burner.

At 516, the method includes operating the fuel burner to produce exhaust gas. In one example, the method at 516 includes injecting fuel into a combustion chamber of the fuel burner and combusting (e.g., burning) the injected fuel and intake air within the fuel burner to produce exhaust gas. As one example, the method at 518 includes operating the fuel burner while the engine and engine coolant are still hot. For example, the engine may be above a threshold temperature. Further, operating the fuel burner may be independent of coolant temperature and/or cabin temperature of the vehicle. At 518, the method includes routing the produced exhaust gas from the fuel burner outlet to the turbine coupled to the generator (e.g., directing exhaust gas to the turbine-generator). In one example, when the turbine-generator is included on one of the turbocharger turbines, or an auxiliary turbine arranged in the main exhaust passage, the method includes directing the produced exhaust gas through the exhaust passage to the turbine-generator. In another example, when the turbine-generator is an auxiliary turbine located in a bypass passage arranged in parallel with the main exhaust passage and one of the turbocharger turbines, the method at 518 includes adjusting one or more valves disposed in the bypass passage (and/or the exhaust passage) to direct the exhaust gas through the bypass passage and to the turbine-generator and not through the turbocharger turbine arranged in parallel with the turbine-generator.

At 520, the method includes recovering exhaust energy via the turbine-generator and powering one or more electrical components with the recovered energy. As one example, the method at 520 includes converting rotational energy from the turbine shaft into electrical energy at the generator and then supplying the energy to one or more electrical components based on an electrical demand of the one or more electrical components. As such, a larger amount of power may be supplied to electrical components having larger electrical demands. At 522, the method includes continuing to operate the fuel burner based on electrical demands of the one or more electrical components. For example, an amount of fuel injected at the fuel burner and the amount of intake air directed to the fuel burner may increase as the electrical demand of the electrical components increases. Further, in one example, as shown at 524, the method may include continuously operating the fuel burner and adjusting the fuel and air directed to the fuel burner based on the electrical demand of the electrical components. In another example, as shown at 526, the method include cycling the fuel burner on and off based on the electrical demand of the electrical components (and thus not operating the burner continuously during a duration of the engine shut down). At 528, the method includes determining whether an engine start (e.g., re-start) has been requested. For example, an engine start may be requested if there is a request to provide power to the vehicle. If there is not a request to start the engine, the method returns to 522 to continue operating the fuel burner based on electrical demands of the engine system. Alternatively, if there is a request to start the engine, the method continues to 530 to stop operating the fuel burner, stop routing intake air to the burner, and restart the engine.

In this way, a turbine-generator may be used during engine operation to recover exhaust energy produced by cylinders of the engine and provide the recovered energy to one or more of the engine, electrical components, or the turbine of the turbine-generator. The turbine-generator may also be used when the engine is not operating, in conjunction with a fuel burner, to recover exhaust energy produced by the fuel burner and provide the recovered exhaust energy to one or more electrical components of the engine. In one example, the turbine-generator may be included on one of the turbocharger turbines of the engine. In another example, the turbine-generator may be included as an additional, auxiliary turbine either in series or in parallel with the one or more turbocharger turbines. In this way, the technical effect of shutting down the engine and providing power to one or more electrical components via the fuel burner and turbine-generator system is to continue operating electrical components of the engine while reducing fuel consumption of the engine. Engine wear may also be reduced by reducing engine idle periods. Further, a same turbine-generator may be used during both engine operation and when the engine is off to power electrical components of the engine. This may reduce a number of components of the engine.

As one embodiment, a system for an engine comprises a first turbocharger including a first compressor driven by a first turbine, the first turbine disposed in an exhaust of the engine; a fuel burner fluidly coupled to the exhaust upstream of the first turbine; a generator coupled to one of the first turbine or an auxiliary, second turbine fluidly coupled to the exhaust downstream of the fuel burner; and one or more bypass valves configured to adjust a flow of air that bypasses the engine and is delivered to the fuel burner. In one example, the system may further comprise an engine bypass passage coupled between an intake of the engine and the exhaust, where the one or more bypass valves include a first bypass valve disposed in an intake of the engine, downstream in the intake from where the engine bypass passage couples to the intake, and a second bypass valve disposed in the exhaust, upstream in the exhaust from where the bypass passage couples to the exhaust, and where the fuel burner is disposed within the bypass passage. In another example, the exhaust is fluidly coupled to a plurality of non-donor cylinders of the engine and the one or more bypass valves is an exhaust gas recirculation (EGR) valve disposed in an EGR passage, where a first end of the EGR passage is fluidly coupled to the exhaust and a second end of the EGR passage is fluidly coupled to an intake of the engine, and where the EGR passage is configured to receive exhaust gas from a donor exhaust manifold coupled to a plurality of donor cylinders of the engine during engine operation. In yet another example, the exhaust includes an exhaust passage directly coupled to the plurality of non-donor cylinders, the first end of the EGR passage is directly coupled to the exhaust passage, and the fuel burner and first turbine are fluidly coupled to the exhaust passage. In one example, the generator is coupled to the second turbine and the second turbine is positioned in series with the first turbine. In another example, the generator is coupled to the second turbine and the second turbine is positioned in parallel with the first turbine. The system may further comprise a second turbocharger including a second compressor driven by a third turbine, the third turbine fluidly coupled to the exhaust and positioned in series with the first turbine. Further, the fuel burner may be fluidly coupled to the exhaust, upstream of both the second turbocharger and the first turbocharger, the system may further comprise an engine bypass passage coupled between an intake of the engine, downstream in the intake from the first compressor and second compressor and upstream in the intake from a charge air cooler, and the exhaust, upstream in the exhaust from the fuel burner, the first turbine, and the second turbine, and the one or more bypass valves may include a first bypass valve disposed in the engine bypass passage, a second bypass valve disposed in the intake downstream from where the engine bypass passage couples to the intake, and a third bypass valve disposed in the exhaust upstream from where the engine bypass passage couples to the exhaust. In an example, the generator is coupled to the second turbine, the second turbine is positioned in parallel with the first turbine within a bypass passage around the first turbine, and the system further comprises a second bypass valve disposed in the bypass passage around the first turbine. The system may further comprise a controller including non-transitory memory with computer-readable instructions for operating the fuel burner to produce exhaust gas, adjusting the first bypass valve to flow air from an intake of the engine to the fuel burner, and recovering exhaust energy from the produced exhaust gas via the generator in response to the engine being shut down. The may also further comprise an electrical component electrically coupled with the generator and the instructions may further include instructions for operating the electrical component via energy stored at the generator while the engine is shut down.

As another embodiment a method comprises, after shutting down an engine and while the engine is shut down: adjusting one or more valves configured to adjust a flow of air through an engine bypass passage, the engine bypass passage fluidly coupled between an intake passage and exhaust passage of the engine, to flow air to a fuel burner fluidly coupled to the exhaust passage upstream of a first turbocharger turbine; operating the fuel burner to produce exhaust gas; recovering exhaust energy downstream of the fuel burner via a generator directly coupled to one of a shaft of the first turbocharger turbine, an auxiliary turbine coupled in series with the first turbocharger turbine, or an auxiliary turbine coupled in parallel with the first turbocharger turbine; and powering one or more electrical components of the engine while the engine is shut down using the recovered exhaust energy. The method may further comprise determining to shut down the engine in response to a demanded power level of the engine being below a threshold and based on one or more of an electrical demand from the one or more electrical components and an amount of electrical energy stored at the generator. In another example, the method may comprise, after shutting down the engine, starting either the first turbocharger turbine or auxiliary turbine coupled with the generator via energy stored at the generator. In yet another example, the method may further comprise, before shutting down the engine, starting either the first turbocharger turbine or auxiliary turbine coupled with the generator using exhaust energy produced at the engine. In one example, adjusting the one or more valves and operating the burner occurs while the engine is hot and includes determining an amount of opening of the valve and an amount of fuel injected to the burner based on an electrical demand of the one or more electrical components. The method may further comprise, when the engine is operating, flowing exhaust gas to the first turbocharger turbine and, in response to a speed of the first turbocharger turbine being greater than desired for torque demand, recovering exhaust energy via the generator. In another example, the method may comprise, in response to the speed of the first turbocharger turbine being less than desired for torque demand, supplying energy from the generator to the first turbocharger turbine to increase the speed of the first turbocharger turbine.

As yet another embodiment, a system comprises a first turbocharger including a first turbine disposed in an exhaust passage and a first compressor disposed in an intake passage, the first compressor driven by the first turbine, where the exhaust passage is fluidly coupled to a plurality of non-donor cylinders; an exhaust gas recirculation (EGR) system fluidly coupled to a plurality of donor cylinders and including a first EGR passage coupled between the intake passage and the plurality of donor cylinders and a second EGR passage coupled between the first EGR passage and the exhaust passage, where the first EGR passage includes a first EGR valve and the second EGR passage includes a second EGR valve; a fuel burner fluidly coupled to the exhaust passage upstream of the first turbine and downstream of where the second EGR passage couples to the exhaust passage; and a generator coupled to one of the first turbine or an auxiliary turbine coupled to the exhaust passage downstream of the fuel burner. The system may further comprise a second turbocharger including a second turbine disposed in the exhaust passage downstream of the first turbine and a second compressor disposed in the intake passage upstream of the first compressor, the second compressor driven by the second turbine and where the generator is coupled to one of the first turbine, the second turbine, or the auxiliary turbine coupled to the exhaust passage downstream of the fuel burner. The system may further comprise an electrical component electrically coupled with the generator and a controller including non-transitory memory with computer readable instructions for: shutting down the engine, adjusting the first EGR valve and second EGR valve to provide air flow from the intake passage to the fuel burner, operating the fuel burner to produce exhaust gas, recovering energy from the exhaust gas via the generator, and powering the electrical component with the recovered energy.

As still another embodiment, a system comprises a first turbocharger including a first turbine disposed in an exhaust passage and a first compressor disposed in an intake passage, the first compressor driven by the first turbine, where the exhaust passage is fluidly coupled to a plurality of cylinders; an engine bypass passage coupled between the intake passage and exhaust passage; a fuel burner disposed in one of: the engine bypass passage, the exhaust passage upstream of the first turbine and downstream of where the engine bypass passage couples to the exhaust passage, or in a second bypass passage fluidly coupled to the exhaust passage upstream of the first turbine and downstream of where the engine bypass passage couples to the exhaust passage; and a generator coupled to one of the first turbine or an auxiliary turbine coupled to the exhaust passage downstream of the fuel burner. The system may further comprise a second turbocharger including a second turbine disposed in the exhaust passage downstream of the first turbine and a second compressor disposed in the intake passage upstream of the first compressor, the second compressor driven by the second turbine and where the generator is coupled to one of the first turbine, the second turbine, or the auxiliary turbine coupled to the exhaust passage downstream of the fuel burner. In another example, the system may further comprise an electrical component electrically coupled with the generator and a controller including non-transitory memory with computer readable instructions for: shutting down the engine, adjusting one or more bypass valves disposed in one or more of the intake passage, engine bypass passage, or exhaust passage to provide air flow from the intake passage to the fuel burner, operating the fuel burner to produce exhaust gas, recovering energy from the exhaust gas via the generator, and powering the electrical component with the recovered energy.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
an engine;
a bypass passage extending between an intake passage and exhaust passage, the bypass passage bypassing the engine;
a turbine positioned within the exhaust passage and coupled to a generator or an alternator;
a fuel burner positioned upstream of the turbine and downstream of the bypass passage; and
a controller configured to:
operate the fuel burner to provide burner exhaust to the turbine when the engine is off, and
operate a valve to provide airflow through the bypass passage when the engine is off.

2. The system of claim 1, wherein the fuel burner is within the bypass passage.

3. The system of claim 1, wherein the fuel burner is within a second bypass passage.

4. The system of claim 1, wherein the fuel burner is within the exhaust passage.

5. The system of claim 1, further comprising one or more of a second engine bypass valve and a third engine bypass valve,
the second engine bypass valve positioned within the intake passage and controlling airflow to the engine, and
the third engine bypass valve positioned within the exhaust passage and controlling airflow from the engine into the exhaust passage.

6. The system of claim 1, further comprising a second bypass passage extending between the intake passage and the exhaust passage, the second bypass passage bypassing the engine; and
a second fuel burner positioned within the second bypass passage.

* * * * *